United States Patent
Suthar et al.

(10) Patent No.: US 10,939,308 B2
(45) Date of Patent: Mar. 2, 2021

(54) DEPLOYING NETWORK FUNCTIONS IN A COMMUNICATION NETWORK BASED ON GEO-SOCIAL NETWORK DATA

(71) Applicant: Cisco Technology, Inc., San Jose, CA (US)

(72) Inventors: Om Prakash Suthar, Bolingbrook, IL (US); Arghya Mukherjee, Acton, MA (US); Amarnath Sury Arvind, Hinsdale, IL (US); Aeneas Sean Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/353,777

(22) Filed: Mar. 14, 2019

(65) Prior Publication Data
US 2020/0296603 A1    Sep. 17, 2020

(51) Int. Cl.
| G06F 15/173 | (2006.01) |
| G06F 15/16 | (2006.01) |
| H04W 24/02 | (2009.01) |
| H04L 12/24 | (2006.01) |
| H04W 64/00 | (2009.01) |

(52) U.S. Cl.
CPC ............ *H04W 24/02* (2013.01); *H04L 41/12* (2013.01); *H04W 64/00* (2013.01)

(58) Field of Classification Search
CPC ........ H04W 24/02; H04W 64/00; H04L 41/12
USPC .................................. 709/225–226, 227–228
See application file for complete search history.

(56) References Cited

U.S. PATENT DOCUMENTS

| 5,551,066 A | 8/1996 | Stillman et al. |
| 7,463,890 B2 | 12/2008 | Herz et al. |
| 9,014,161 B2 * | 4/2015 | Calo ................ G06F 16/2246 370/338 |
| 9,900,779 B2 * | 2/2018 | Palanki ................ H04W 24/02 |
| 10,269,017 B1 * | 4/2019 | Phillips .............. H04L 63/0492 |
| 2011/0225012 A1 * | 9/2011 | Harwood ............... G06Q 10/02 705/6 |
| 2014/0143407 A1 | 5/2014 | Zhang et al. |
| 2017/0064015 A1 | 3/2017 | Davis et al. |

(Continued)

OTHER PUBLICATIONS

Quadri, Christian, et al., "Big-Data Inspired, Proximity-Aware 4G/5G Service Supporting Urban Social Interactions," May 2016, 9 pages.

(Continued)

*Primary Examiner* — Bharat Barot
(74) *Attorney, Agent, or Firm* — Polsinelli PC (57) ABSTRACT

A network device such as a network function (NF) entity or an application function (AF) entity in a communication network monitors network traffic for a plurality of peer-to-peer transactions associated with an application, where each peer-to-peer transaction includes communications between a user and a peer in the communication network. The network device also determines a set of geographic locations corresponding to one or more peer endpoints for the plurality of peer-to-peer transactions based on the network traffic, and determines an optimal midpoint between the set of geographic locations. The network device further deploys an edge node in the communication network to serve a subsequent peer-to-peer transaction for the application based on the optimal midpoint.

19 Claims, 8 Drawing Sheets

(56) References Cited

U.S. PATENT DOCUMENTS

| | | | |
|---|---|---|---|
| 2017/0163745 A1 | 6/2017 | Yin et al. | |
| 2018/0124249 A1* | 5/2018 | Hassan | H04L 12/1818 |
| 2018/0287878 A1* | 10/2018 | Jarnikov | H04L 41/12 |
| 2019/0123985 A1* | 4/2019 | Rao | H04L 41/14 |
| 2019/0245734 A1* | 8/2019 | Wu | H04L 41/12 |
| 2020/0028900 A1* | 1/2020 | Rice | H04W 76/10 |

OTHER PUBLICATIONS

Shankar, Pravin, "Improving Performance, Privacy and Relevance of Location-Based Services for Mobile Users," Oct. 2011, 134 pages.

International Search Report and Written Opinion from the International Searching Authority, dated Jun. 4, 2020, 12 pages, for corresponding International Patent Application No. PCT/US2020/021423.

* cited by examiner

DEPLOYING NETWORK FUNCTIONS IN A COMMUNICATION NETWORK BASED ON GEO-SOCIAL NETWORK DATA

TECHNICAL FIELD

The present subject matter generally relates to communication networks, and more particularly, to optimizing selection and deployment of edge nodes for peer-to-peer communications in telecommunication networks (e.g., 4G, 5G, etc.).

BACKGROUND

A transition is underway from existing 4G networks to new 5G networks, which provide a service-oriented architecture for provisioning network services/resources in a dynamic, scalable, and customizable fashion (e.g., microservices, network functions virtualization (NFV), etc.). Notably, some of these network services relate to peer-to-peer communications between mobile users. For example, today, over 15% of mobile internet traffic comprises peer-to-peer communications (e.g., Voice over IP (VOIP), WhatsApp, FaceTime, Skype, Tribe, massive multi-player online role playing games (MMORPG), Telegram, WebEx, and so on), and it is expected the supporting peer-to-peer network services will account for an ever increasing amount of total network traffic in the 5G networks. Peer-to-peer network services generally offload network traffic from traditional network infrastructures by deploying networking, compute, and storage capabilities at an edge of a mobile network and further secure these communications between the peers (e.g., on a peer-to-peer basis). While conventional methods for selecting and deploying peer-to-peer edge nodes are appropriate for existing network architectures/infrastructures, the new service-oriented architecture of 5G networks presents new challenges and creates new opportunities to better optimize selection and deployment of peer-to-peer network edge nodes.

BRIEF DESCRIPTION OF THE DRAWINGS

The examples herein may be better understood by referring to the following description in conjunction with the accompanying drawings in which like reference numerals indicate identical or functionally similar elements. Understanding that these drawings depict only exemplary examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

This disclosure describes techniques for selecting, deploying or otherwise provisioning an optimal edge node in a telecommunication network (e.g., 4G/5G networks, etc.) in support of peer-to-peer network services. For example, according to one or more examples of this disclosure, a network entity such as a core network function (NF) or an application function (AF) monitors network traffic for a plurality of peer-to-peer transactions associated with an application, where each peer-to-peer transaction includes communications between a user and a peer in a communication network. The network device also determines a set of geographic locations (e.g., latitude/longitude) corresponding to one or more peer endpoints for the plurality of peer-to-peer transactions based on the network traffic, and determines an optimal midpoint between the set of geographic locations. The network device further deploys an edge node in the communication network to serve a subsequent peer-to-peer transaction for the application based on the optimal midpoint. These and other features are described in greater detail herein.

Description

Various examples of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), which include a number of network devices/modules/entities such as "Network Function(s)" (NF(s)) and/or "Application Function(s)" (AF(s)), as is appreciated by those skilled in the art. For sake of clarity, the network devices described herein generally refer to NFs and AFs specified by existing Technical Specifications, including the 3GPP TS 23.501, TS 23.502, TS 24.501, TS 29.509, TS 29.518, TS 33.301, TS 33.501, and the like, each of which is incorporated herein by reference to its entirety. Moreover, while some operations and functionality described herein may be attributed to a particular NF/AF, it is appreciated that such operations are not intended to be limited to the particular NF/AF, but may be performed by other network entities, NFs, AFs, etc., as appropriate, particularly in view of the ongoing development and evolving nature of telecommunication networks and the current transition to 5G networks.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs). Notably, communications among different network nodes can also be performed by long distance wireless networks. LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

Figure 1:
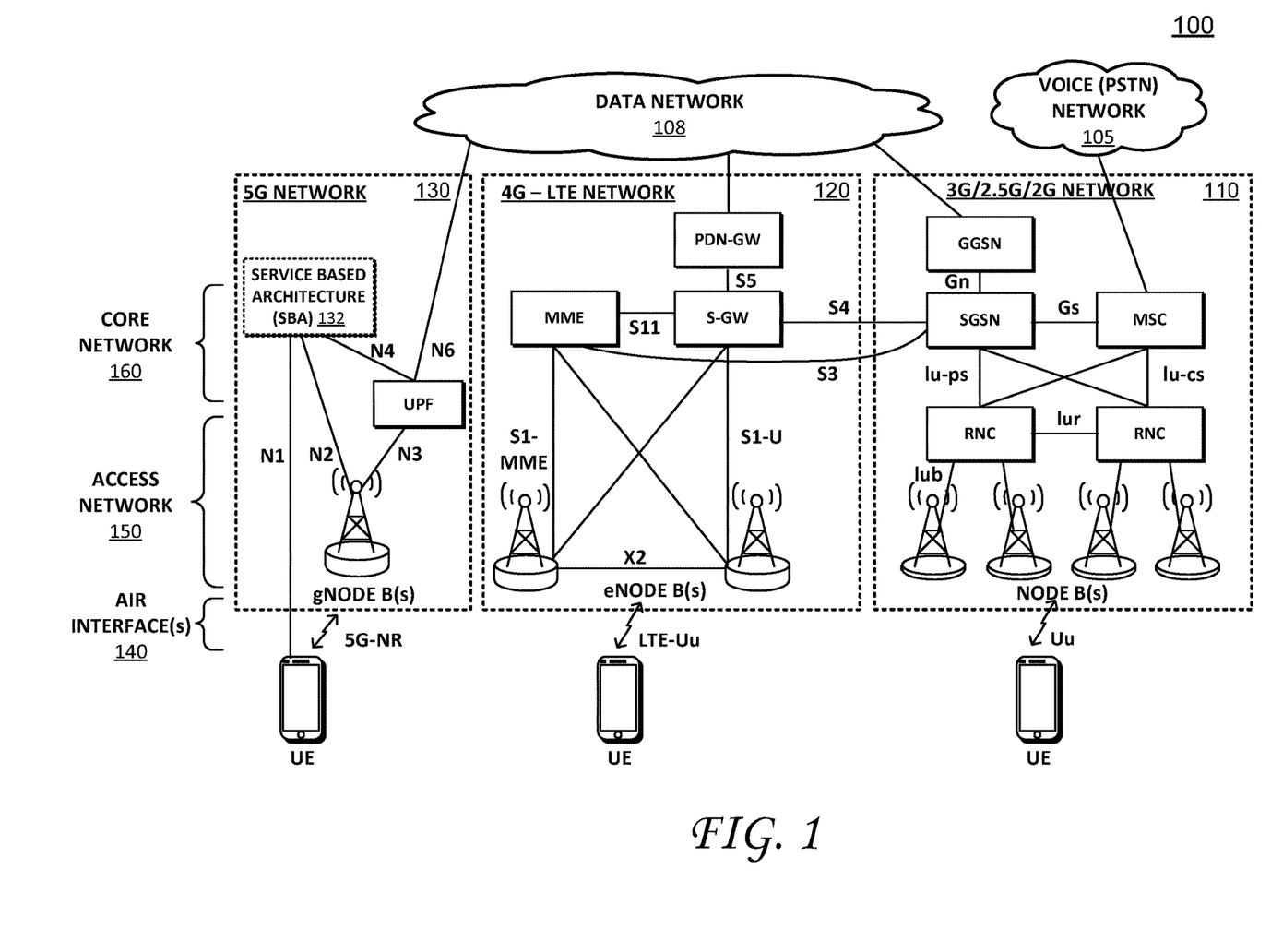
FIG. 1 illustrates a schematic block diagram of exemplary telecommunication networks, including a 3G network, a 4G network, and a 5G network.

FIG. 1 illustrates a schematic block diagram of exemplary telecommunication networks 100, including a 3G network 110, a 4G network 120, and 5G network 130. Telecommunication networks 100 include wireless network interfaces or communication links, such as air interfaces 140, an access network 150, which represents radio infrastructure or radio towers, and a core network 160, which represents respective core network entities, network modules, or Network Functions (NF(s)). The wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used. Further, it is appreciated the representations of telecommunication networks 100, including respective interconnected network entities, are illustrated and described herein for purposes of simplicity and discussion, not limitation, and it is appreciated that the illustrated networks can include (or exclude) any number of network entities, communication links, and the like, and can support inter-network operability and compatibility.

Still referring to FIG. 1, access network 150 represents the infrastructure or radio towers, such as a Radio Access Network (RAN), for transmitting and receiving data packets between end user nodes (UE) as well as the various network entities (e.g., core network entities). Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks.

Respective network entities that form core network 160 (within the telecommunication networks 100) operatively connect respective RAN infrastructure (NBs, eNBs, gNBs) to third party networks such as a voice network 105 (e.g., a Public Switched Telephone Network (PSTN) network) and/or a data network 108 to create end-to-end connections. Prior to 3G (e.g., 2G, 2.5G, etc.) the third party network primarily included a voice network/PSTN 105 (e.g., a circuit switched network). From 3G onward, the third party network transitioned to include a public network (e.g., the Internet), represented by data network 108 (e.g., a packet switched network). Core network 160 and its respective network entities collectively operate to manage connections, bandwidth, and mobility for respective UE.

Notably, core network 160 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 110, session management includes a standalone General Packet Radio Service (GPRS) network, while 4G network 120 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

5G network 130, as discussed in greater detail herein, introduces a new Service Based Architecture (SBA) 132, which generally redistributes functionality of 4G network entities into smaller service-based functions/network entities. In addition, packet routing and forwarding functions (which are performed by SGW and PGW in 4G network 120) are realized as services rendered through a new network function/entity called the User Plane Function (UPF). In this fashion, 5G network 130 provides a modular set of services that support dynamic and scalable deployment of resources to satisfy diverse user demands.

Notably, the illustrated telecommunication networks 100 (e.g., 4G network 120, 5G network, 130, etc.) generally support peer-to-peer network services and/or peer-to-peer transactions, which represent communications between network devices (e.g., UE to UE communications). In general, peer-to-peer networking services allow network devices to share resources and communicate directly with each other. Peer-to-peer network services may be distributed by an application architecture that can partition tasks or workloads between peer nodes. For example, the peer nodes in a peer-to-peer network may provide portions of their resources, such as processing power, disk storage or network bandwidth, directly to other network peers, without central coordination by conventional servers or hosts. In this fashion, peers nodes can operate as both suppliers and consumers of resources (e. clients and servers to other nodes in the peer network).

Figure 2:
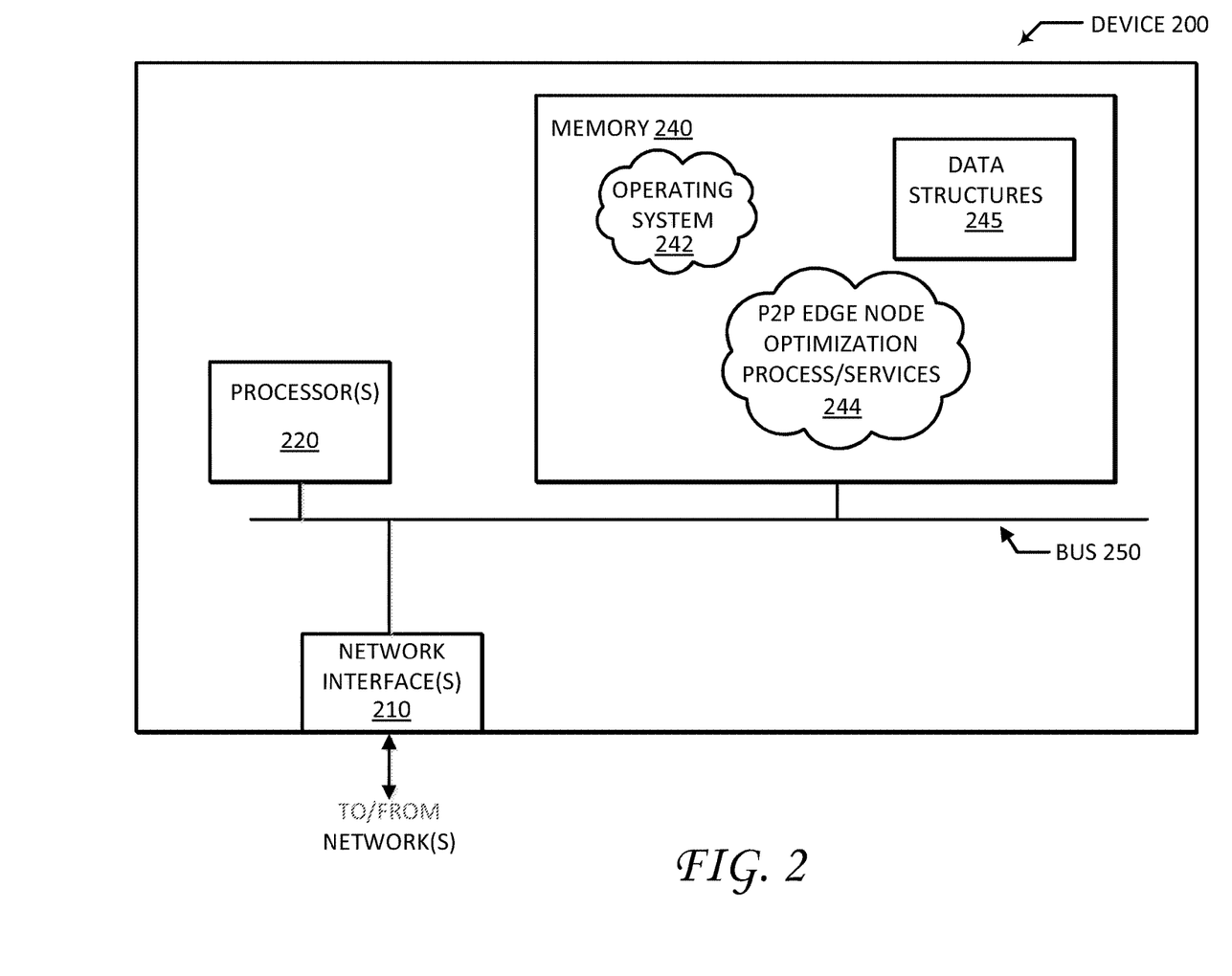
FIG. 2 illustrates a schematic block diagram of an exemplary network device, such as a Network Function (NF) entity/module or an Application Function (AF) entity/module, according to one or more examples of this disclosure.

FIG. 2 illustrates a schematic block diagram of an exemplary network device 200 (e.g., a Network Function (NF) entity, an Application Function (AF) entity, etc.) that may be used with one or more examples described herein, e.g., particularly as one of the NFs within SBA 132 and/or an AF in communication with SBA 132.

The illustrative device 200 comprises one or more network interfaces 210, at least one processor 220, and a memory 240 interconnected by a system bus 250. Network interface(s) 210 contain the mechanical, electrical, and signaling circuitry for communicating data over links (e.g., wires or wireless links) within the telecommunication networks 100 (e.g., ref. FIG. 1). Network interfaces 210 may be configured to transmit and/or receive data using a variety of different communication protocols (e.g., peer-to-protocols, etc.), as will be understood by those skilled in the art.

Memory 240 comprises a plurality of storage locations that are addressable by processor 220 for storing software programs and data structures associated with the examples described herein. Processor 220 may comprise necessary elements or logic adapted to execute the software programs (e.g., geo-social applications such as Voice over IP (VoIP), and etc.) and manipulate data structures 245. An operating system 242, portions of which are typically resident in memory 240 and executed by processor 220, functionally organizes the device by, inter alia, invoking operations in support of services and/or software processes executing on the device/module. These services and/or software processes may comprise an illustrative "peer-to-peer (P2P) edge node optimization" process/service 244, as described herein. Note that while processes/services 244 are shown are part of memory 240, in some examples, these processes/services may to be operated in a distributed communication network or as part of a distributed application architecture.

Illustratively, the techniques described herein may be performed by hardware, software, and/or firmware, such as in accordance with the illustrative P2P edge node optimization process 244, which may contain computer executable instructions executed by processor 220 to perform functions relating to peer-to-peer communications (e.g., deploying, provisioning, selecting, or otherwise instantiating optimal edge nodes for P2P sessions based on geo-social network data/graphs, etc.), described in greater detail herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having P2P edge node optimization process 244 encoded thereon.

Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, peer-to-peer communications represent an ever increasing amount of internet traffic. Importantly, peer-to-peer network services offload network traffic from traditional network infrastructures onto network resources (e.g., networking, computer, storage, etc.) at an edge of a network. In turn, peer-to-peer network services, in the context of telecommunication networks, create challenges regarding resource allocation, quality of service, and overall mobility management. For example, the new 5G network provide a service-oriented architecture for provisioning network services/resources in a dynamic, scalable, and customizable fashion (e.g., micro-services, network functions virtualization (NFV), etc.). This service-oriented architecture, which employs network slices, presents new challenges regarding resource allocation, maintaining appropriate quality of service (QoS)/quality of experience (QoE) parameters, mobility management, and so on. Accordingly, the techniques disclosed herein particularly improve peer-to-peer network services/communications by optimizing selection and deployment of edge nodes (e.g., in support of underlying peer-to-peer communications). While the techniques described below provide context corresponding to 5G networks, it is appreciated that such techniques may be employed by other networks as well as existing networks (e.g., 4G, etc.).

Figure 3:
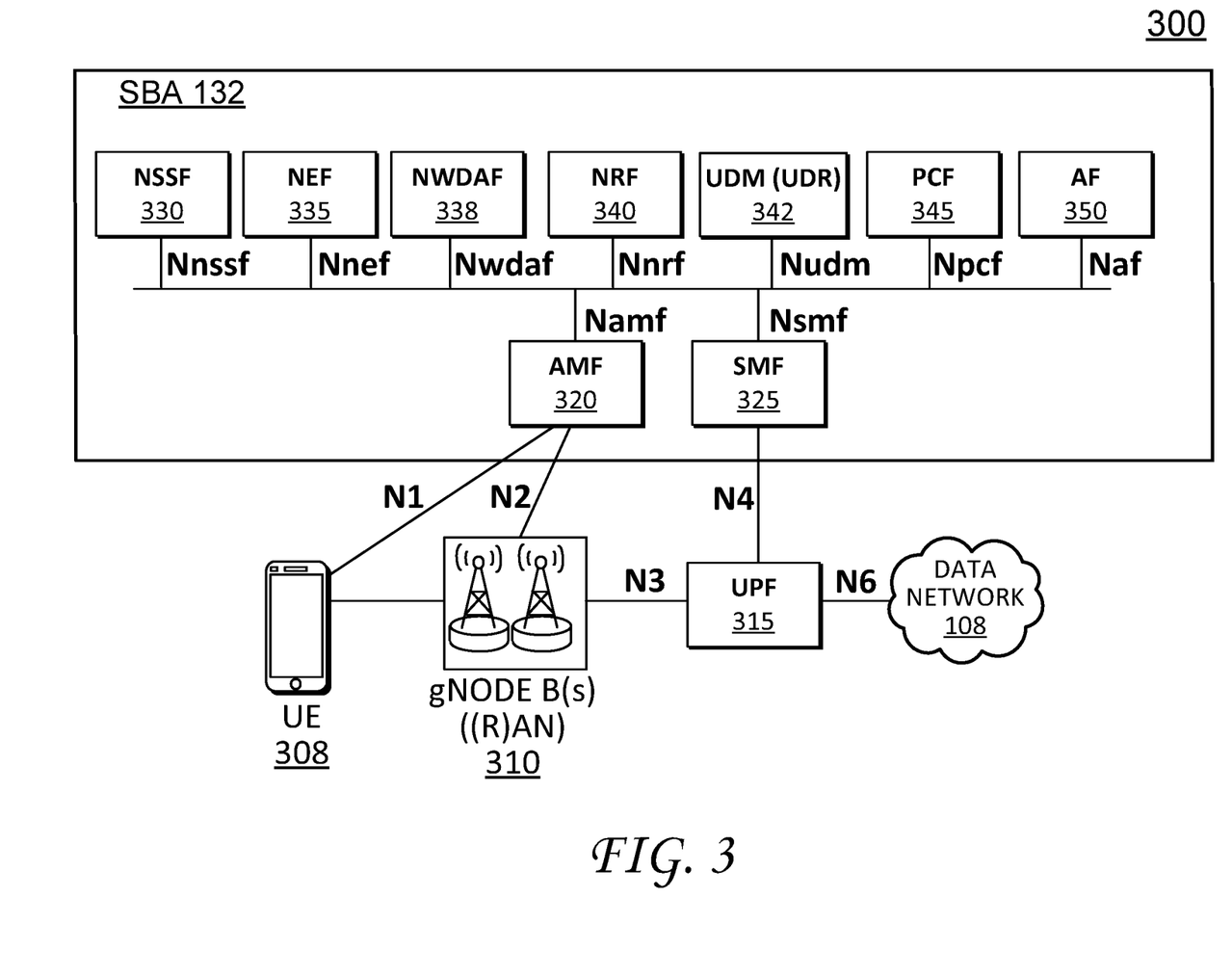
FIG. 3 illustrates schematic block diagram of a core network entities that from an Service Based Architecture (SBA) for a 5G network.

Referring again to the figures, FIG. 3 illustrates a schematic block diagram 300 of a Service Based Architecture (SBA) 132 for a 5G network (e.g., 5G network 130). SBA 132 illustrates various network entities or network functions (NFs) that support the disclosed P2P edge node optimization process/services (e.g., process/services 244).

The network entities that form SBA 132 include, for example, AMF 320, SMF 325, Network Slice Selection Function (NSSF) 330, Network Exposure Function (NEF) 335, Network Data Analytics Function (NWDAF) 338, Network Repository Function (NRF) 340, User Data Management (UDM) 342 (which can include and/or access a User Data Repository (UDR)), Policy Control Function (PCF) 345, and Application Function (AF) 350. Each of these network entities can be implemented either as a network element on a dedicated hardware, as a software instance running on a dedicated hardware, or as a virtualized function instantiated on an appropriate platform, e.g., a cloud infrastructure, as is appreciated by those skilled in the art.

In general, UE 308 connects to RAN/Access Network (AN) 310 as well as AMF 320. Here, the RAN can include a base station while the AN can include a base station supporting non-3GPP access, e.g., Wi-Fi access. AMF 320 provides UE-based authentication, authorization, mobility management, etc. SMF 325 is responsible for session management, IP address allocation to UE(s), and traffic management/selection of a User Plane Function (UPF) (e.g., UPF 315) for proper routing/data transfer. If UE 308 has multiple sessions, different SMFs may be allocated to each session for individual management and/or different functionality per session. AF 350 generally provides information on packet flows to PCF 345, which is responsible for policy control in order to support Quality of Service (QoS). Based on the information from AF 350, PCF 345 determines policies about mobility and session management for proper AMF/SMF operations. AUSF 355 stores authentication data for UE 308, and UDM 342 stores subscription data for UE 308 (e.g., in UDR). Data network 108 provides Internet access or operator services.

NWDAF 338 represents an operator managed network analytics logical function, and provides slice specific network data analytics to a network function (NF) (e.g., PCF 345, NSSF 330, other network entities in SBA 132, or other entities not shown). For example, NWDAF 338 provides network analytics information (e.g., load level information) to a NF on a network slice instance level. NWDAF 338 also notifies slice specific network status analytic information to other NFs that are subscribed to it. NF may collect directly slice specific network status analytic information from NWDAF. This information is not subscriber specific. PCF 345 and/or NSSF 330 may be consumers of these network analytics—e.g., PCF 345 may use that data in its policy decisions, NSSF 330 may use the load level information provided by NWDAF for slice selection, and so on. NWDAF uses machine learning (ML) algorithms which can be employed to monitor trends, make predictions and optimize network slicing at an edge of the network. For example, a network function may request specific analysis information on a load level of a particular edge network slice. Alternatively, the network function can use a subscribe service to ensure that it is notified by the NWDAF if the load level of an edge network slice changes or reaches a specific threshold. In such case NWDAF will redirect Network Slice Selection Function (NSSF) to instantiate new slice or re-direct traffic to edge slice which is not under-utilized.

The foregoing operations (and additional functionality) for respective network entities of SBA 132 can be found in 3GPP Technical Specification (TS) 23.501 and TS 23.502, which are incorporated by herein by reference to its entirety.

Figure 4:
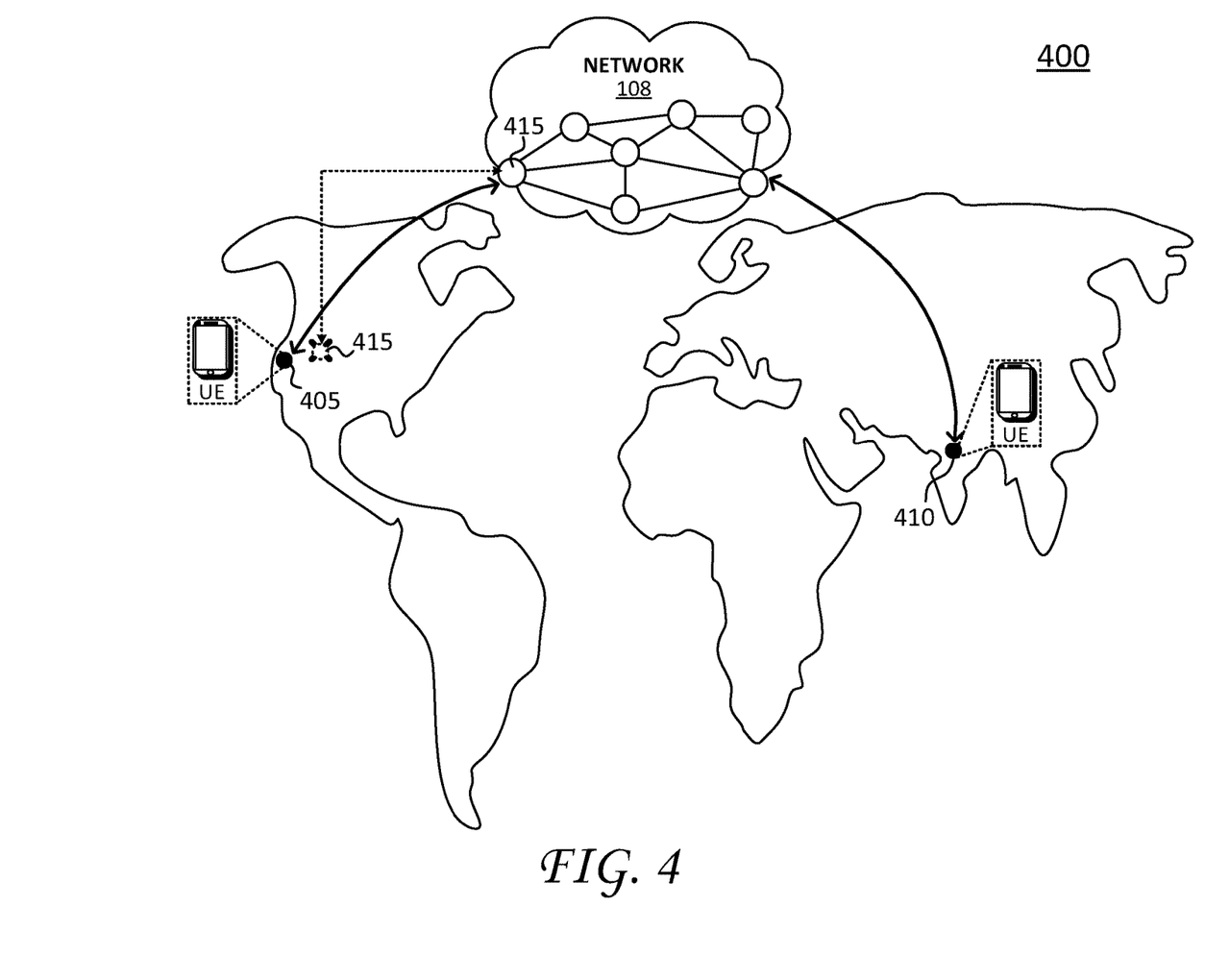
FIG. 4 illustrates a schematic block diagram of peer-to-peer communications between mobile devices (e.g., User Equipment (UE)) in the 5G network, which is geographically dispersed across different continents.

FIG. 4 illustrates a schematic block diagram 400 of peer-to-peer communications between mobile devices in the 5G network (e.g., 5G network 130). In particular, diagram 400 shows peer-to-peer communications between User Equipment (UE) 405 and UE 410 over network 108 (e.g., the Internet). As illustrated, the peer-to-peer communications can represent a peer-to-peer-SIP, which can implement a distributed voice over Internet Protocol (VoIP) or instant messaging communications where session control between communication end points is facilitated with a Session Initiation Protocol (SIP).

SIP is a signaling protocol for initiating, maintaining, and terminating real-time communication sessions, including for example, voice and messaging applications, as is appreciated by those skilled in the art. In operation, SIP provides an end-to-end protocol, where SIP messages are routed via SIP proxies from the originator to the target user. SIP entities (e.g., UE 405/410) generally have a peer-to-peer relationship between each other, thus any entity can send the initial request and any entity is capable receiving requests. During a single transaction, the entities are in a client-server relationship, where the request sender functions as the client, and the party who sends the reply, as the server.

Here, network 130 represents an overlay network of nodes organized for enabling real-time communications using SIP. Collectively, the nodes in the overlay network provide a distributed mechanism for mapping names to overlay locations. For example, in the context of the peer-to-peer SIP, UE 405 and UE 410 act as user agents or endpoint devices/nodes that support SIP. In general, a user agent registers to a registrar of its home domain (e.g., register to one or more NFs in SBA 132) and provides a register request to the registrar. This request typically includes a user's current address and the user's Address of Record (AOR). The registrar updates the user agent's (e.g., UE's 405/410) current location to the Location service, which creates a mapping between the AOR and the terminal address. UE 405 and UE 410 can establish a peer-to-peer communication channel based on respective AORs and using conventional SIP protocols, as is appreciated by those skilled in the art.

As mentioned, peer-to-peer network services generally offload network traffic from centralized network infrastructures and deploy network resources (e.g., networking, compute, storage, etc.) at an edge node of a mobile network. Accordingly, the geophysical location of the edge node has a large impact on various QoS/QoE, key performance indicators (KPIs), mobility management, and so on. For peer-to-peer communications, the edge node can be determined by an originator's location (e.g., the UE that initiates a peer-to-peer communication session), the type of content to be consumed, an IP address, APN, and/or content caching. For example, as shown, network 108 deploys an edge node 415 to support the peer-to-peer communications between UE 405 and UE 410. Notably, edge node 415 corresponds to a geographic location proximate to UE 405 since UE 405 initiated the communication session.

However, deploying an edge node based on the foregoing may not be optimal in the context of existing 4G networks or 5G networks. For example, the location of the user may not be the same (and often is not) as the location of a peer endpoint for mobile applications running on mobile devices/UEs. Accordingly, the techniques disclosed herein select, deploy, and/or provision an optimal edge node in a telecommunication network based on geo-social network data of peer endpoints for a per-user basis and even a per application basis. In particular, the techniques disclosed herein determine an optimal location for an edge node using historical geo-social network data to build a dynamic geo-social network graph. The dynamic geo-social network graph helps predict geographical locations for endpoint peers in subsequent peer-to-peer transactions for a user. The optimal location for the edge node is determined, in part, based on an optimal midpoint location between the endpoint peers in the dynamic geo-social network graph. These and other operations are described with reference to FIG. 5.

Figure 5:
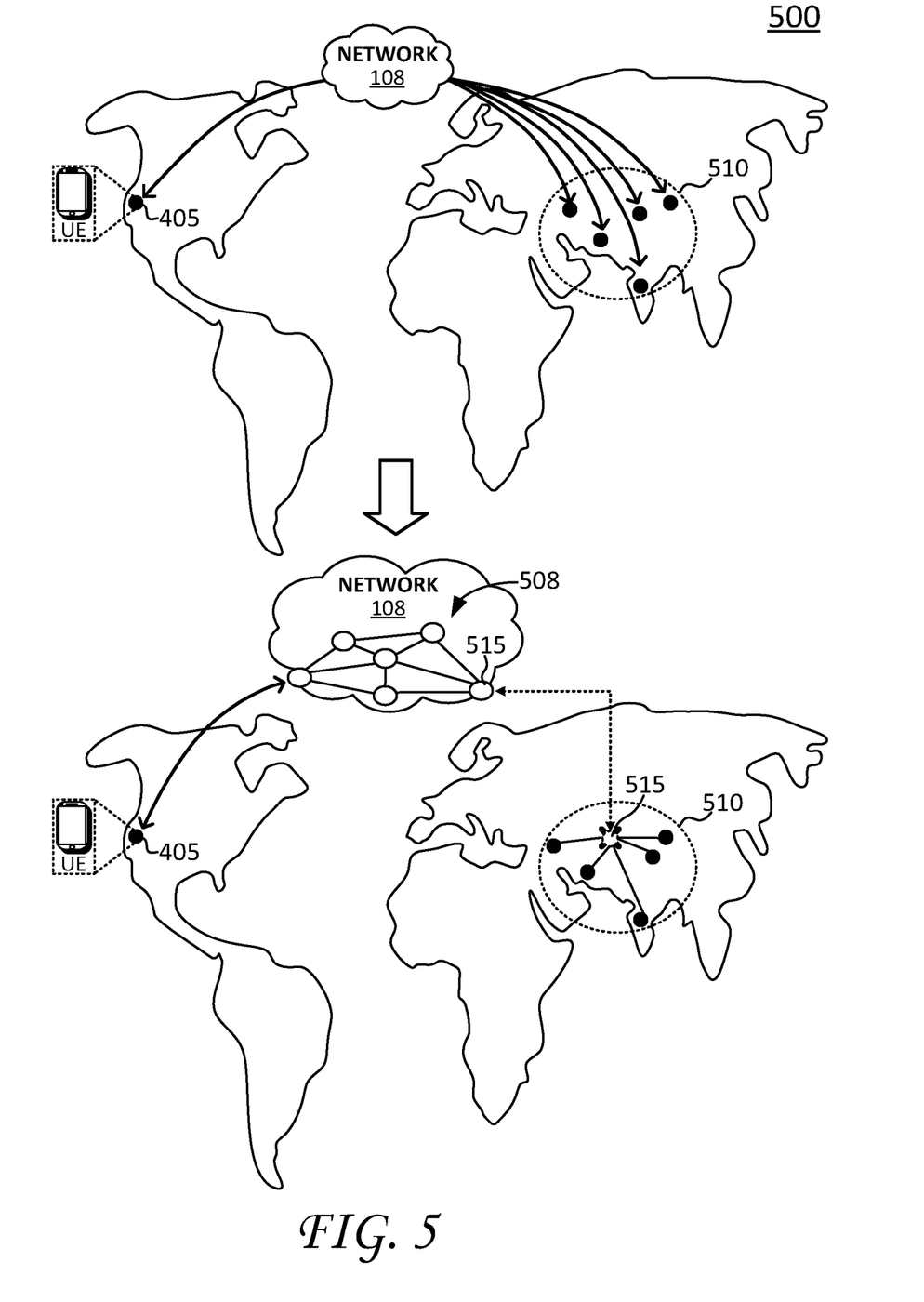
FIG. 5 illustrates a schematic block diagram of one example of an edge node optimization process for determining an optimal edge node location for peer-to-peer applications based on geo-social network data.

FIG. 5 illustrates a schematic block diagram 500, showing one example of the edge node optimization process, whereby a network entity determines an optimal edge node location for peer-to-peer applications based on geo-social network data. In general, the edge node optimization process can be executed by one or more network entities, such as the above-discussed network functions (NFs) that form SBA 132 and/or by device 200 executing the peer-to-peer (P2P) edge node optimization process/service 244. For purposes of discussion, certain operations of the edge node optimization process will be described relative to a network entity. In addition, it should be noted that while many of the operations are discussed with respect to UE 405, it is appreciated that the below operations are more generally performed with respect to a user of UE 405. Accordingly, it is appreciated that this user may employ any number of devices (e.g., tablets, computers, other mobile devices, etc.) for peer-to-peer transactions, and that UE 405 is shown and illustrated for purpose of convenience and discussion, not limitation.

In operation, the network entity determines an optimal location to deploy an edge node (e.g., for a given application) based on an aggregation of peer endpoints. As shown, UE 405 conducts a number of peer-to-peer transactions (e.g., a communication sessions), over network 108, with a number of different peers (UEs), which are generally indicated by reference number 510. Notably, UE 405 can conduct these peer-to-peer transactions by executing/employing a peer-to-peer application (e.g., WhatsApp, Skype, FaceTime, Tribe, MMORPG, Telegram, WebEx, VOIP applications, and the like).

The network entity generally communicates with UE 405 and/or the application accessed by UE 405 to monitor network traffic for the peer-to-peer transactions. Network 108 entity normally do not interact with application platform such as 510 unless there is an AF 350 acting as an API gateway. For example, as discussed in greater detail below, the network entity can communicate directly with an application through AF 350 through PCF (for trusted applications) and/or through NEF 335 (e.g., for untrusted applications) to monitor the network traffic. In addition, it should be noted that the peer-to-peer transactions generally include communications associated with the application executed or employed by UE 405.

Based on the monitored network traffic, the network entity further determines or maps a set of geographic locations, such as coordinates (e.g., latitude, longitude, etc.), for the peer endpoints 510. In some examples, the network entity can receive the geographic locations directly from the application and/or determine the geographic locations from geo-social network data associated with the application (e.g., the SIP protocols update and provide locations for UEs).

The network entity further builds a dynamic geo-social network graph 508 based on an aggregation of geographical locations of the peer endpoints 510. Geo-social network graph 508 includes a network of nodes that support the peer-to-peer transactions between UE 405 and peer endpoints 510. As shown, geo-social network graph 508 also includes an edge node 515, which represents an edge of network 108 proximate to peer endpoints 510. Notably, edge node 515 can represent and/or perform functions associated with UPF 315, discussed above (e.g., ref. FIG. 3).

The network entity determines an optimal edge node location (e.g., latitude, longitude, etc.) for edge node 515 based on a geographical midpoint location between peer endpoints 510. As shown, the optimal edge node location is shown as an average distance or central geographic midpoint between peer endpoint peers 510. Importantly, the geographical midpoint represents an optimal midpoint location, which can include average geographical location, between the peer endpoints. The optimal midpoint location can be further modified by various weights (e.g., based on byte counts, content, etc.) as well as time values or time decay factors (e.g., to emphasize more recent transactions, etc.), as discussed herein. The optimal midpoint location is used to predict and deploy an edge node for subsequent peer-to-peer communications for UE 405.

In one example, the network entity, which can include a network function (NF) associated with an application provider, maps peer transaction endpoints 510 for all transactions for a particular user (e.g., associated with UE 405) to respective latitude and longitude coordinates.

In this example, the network entity assigns an initial weight to each peer transaction based on duration of transaction (e.g., a time period), a byte count for the transaction (e.g., an amount of data), content type, and so on.

For each user, this yields a set of L, where L is the set of all recorded peer-endpoints 510 of the user's (e.g., UE 405) transactions for the application.

Each transaction can be represented by $l_k = [t_k, w_k, lat_k, lng_k]$, where:

"t" is a timestamp of the transaction;
"w" is an initial weight assigned to the transactions (e.g., based on duration, byte count, content type, etc.);
"lat" is a latitude of the corresponding peer endpoint; and
"lng" is the longitude of the corresponding peer endpoint.

Next, the network entity calculates age-modified transforms L→L' such that:

$l_k' > l_k$, where each $w_k * e^{-\lambda*(t_{current} - t_k)} \to w_{k'}$.

The age-modified transforms operate to ensure that current or recent transactions receive more "weight" or "priority" than older transactions. In particular, the factor $\lambda$ determines how quickly the transactions age. For example, the network entity can assign half the "weightage" (e.g., half the value) to a transaction of that is 3 months old as compared to the weightage or value) assigned to a transaction that is a day old.

The network entity further calculates a geographical-midpoint of L' or [G(L')] for each user based on a known geographical midpoint algorithms (e.g., geographic midpoints/centre of gravity, centre of minimum distances, average latitude/longitude, and so on), as is appreciated by those skilled in the art. The geographical-midpoint or [G(L')] is centre-point for the peer endpoints 510 for a given user (UE 405) and represents the optimal edge node location.

Optionally, the network entity can further determine the geographical-midpoints for specific time periods or time slices of interest. For example, a user may have different geo-social behavior based on a time of day, a time of month, holidays (e.g., calling family, etc.), workday times, weekends, and so on. For each timeslice, the network entity can apply a filter to L to find a subset $L_{timeslice}$ such that each "t" in each vector in $L_{timeslice}$ falls in the specified time bounds of the timeslice as follows:

$$L_{timeslice}(t_{start}, t_{end}) = \{(t,w,lat,lng):(t,w,lat,lng) \text{ belongs to } L \text{ and } t_{start} < t < t_{end}\}.$$

The network entity further determines or calculates the geographical-midpoint of $L_{timeslice} = [G(L_{timeslice})]$.

After calculating the geographic-midpoints (e.g., generally or for a given timeslice), the network entity further calculates a normalized and weighted geographical-midpoint across the set of all geo-midpoints for the peer-to-peer transactions. In this fashion, the network entity determines a latitude and longitude for a centre-point of the peer endpoints 510, with optional weights assigned to specific user behaviors during certain periods. This centre-point also represents the optimal edge node location for the timeslice(s) of interest.

The network entity deploys, provisions, selects, or otherwise instantiates subsequent edge nodes (e.g., edge node 515) at or proximate to the optimal edge node location for subsequent peer-to-peer transactions between UE 405 and the peer endpoints 510.

The above calculations and determinations of the optimal edge node location are made with respect to a single user, e.g., associated with UE 405, however these calculations and determinations can be expanded and aggregated for multiple users for a given application. In a multiple user scenario, the network entity calculates the optimal edge node location for peer-to-peer transactions associated with each user and for the same application ($[l_{opt}(u)]$). The network entity further aggregates and clusters (with appropriate weights) the set of all users' optimal edge node location based on known using a weighted model-based clustering algorithms, e.g., such the algorithm described by http://pages.pomona.edu/~jsh04747/Research/WeightedMBClustering_CompGeo_final.pdf.

For the n highest weight clusters, the above calculation yields a set of $n_{lat, lng}$ coordinates that represent the respective n optimal edge node locations for the highest or largest number of transactions for the application.

The network entity further pre-provisions one or more edge nodes at the respective n optimal edge node locations for subsequent peer-to-peer transactions between initiating users of the application and peer endpoint users. With respect to pre-provisioning the edge nodes, the network entity can pre-provision corresponding UPFs at network nodes in proximity to the respective n optimal edge node locations. The 5G network can optimize UPF selection based on inputs from the NWDAF. For example, applications in the DN or the AF can provide information to the NWDAF, which can further optimize the UPF selection algorithms by updating the NRF database and/or by modifying the SMF's configuration. When a UE connects, the SMF can query the NRF to determine the optimum UPF. Alternatively, the SMF can select the UPF based upon the criteria as defined in clause 6.3.3.3 of 3GPP TS 23.501 and match a UPF based on the UE's service requirements. This may be the need to meet low latency criteria for certain applications that the NWDAF has identified.

For the subsequent peer-to-peer transaction, a user (u) signs into the application, and the application signals the optimal location $l_{opt}(u)$ for UPF (e.g., UPF 315) placement at the corresponding edge node. Here, a PCF (e.g., PCF 345) selects the UPF location with least distance to the optimal location. These operations are described in greater below, with reference to the signaling diagram shown in FIG. 7.

Figure 6:
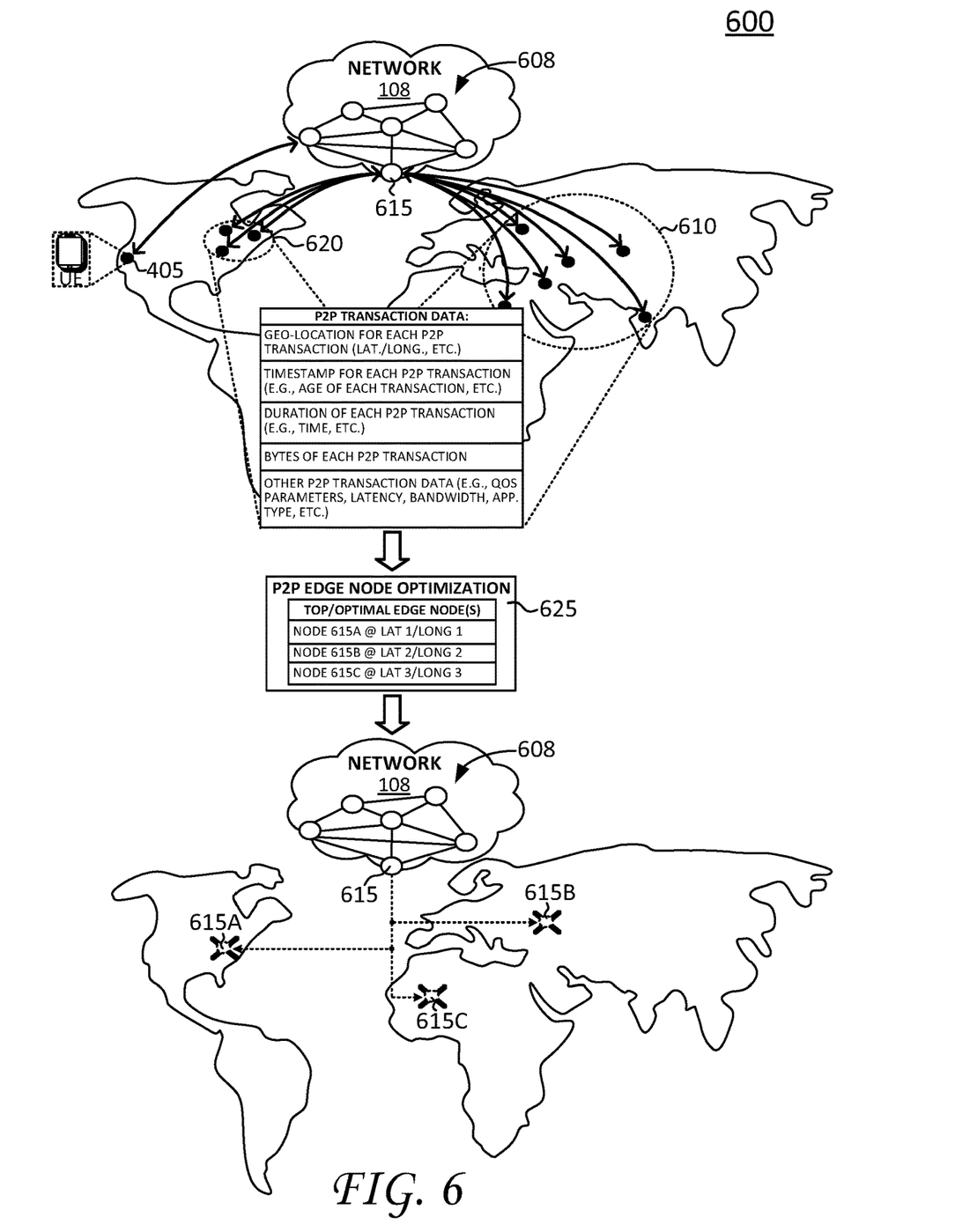
FIG. 6 illustrates a schematic block diagram of another example of the edge node optimization process, showing multiple "top" or optimal edge node locations.

FIG. 6 illustrates a schematic block diagram 600 of another example of the edge node optimization process, whereby the network entity determines multiple "top" optimal edge node locations for a given user (e.g., associated with UE 405). As shown in FIG. 6, UE 405 conducts various peer-to-peer transactions with corresponding peer endpoints indicated by reference numbers 610 and 620 and over network 108.

As shown, the network entity performs many of the same edge node optimization operations as discussed above. For example, the network entity communicates with UE 405 and/or the application executing by UE 405 to monitor network traffic for the peer-to-peer transactions with peer endpoints 610/620. Based on the monitored network traffic, the network entity further determines or maps a set of geographic locations, such as coordinates (e.g., latitude, longitude, etc.), for the peer endpoints 610/620. The network entity further builds a dynamic geo-social network graph 608 based on an aggregation of geographical locations of the peer endpoints 610/620. Here, geo-social network graph 608 includes an edge node 615, which represents an edge of network 108 proximate to peer endpoints 610/620.

While the above-discussed operations describe the network entity determining a single optimal edge node location, here, the network entity further determines multiple "top" edge node locations (e.g., latitude, longitude, etc.) for edge node 615 based on a geographical midpoint location between peer endpoints 610/620.

For example, the optimal edge node locations are indicated by the "top/optimal edge node(s)" table 625, which illustrates peer endpoint node 615A at lat1/long1, node 615B at lat2/long2, and node 615C at lat3/long3. Notably, as discussed above, the network entity determines these top optimal edge node locations based on $l_k=[t_k, w_k, lat_k, lng_k]$. In addition to the above discussed weighting and time decay components, it is appreciated that additional parameters may be incorporated into the weighting—e.g., other P2P transaction data such as QoS parameters, QoE parameters, latency, bandwidth, application type, and so on. The network entity further selects, deploys, and/or (pre) provisions an optimal edge node (e.g., edge node 615) at one of the corresponding locations for nodes 615A, 615B, 615C based on availability and/or based on a given time period. In addition, the non-used optimal edge node locations may serve as backup locations in the event a primary edge node location is no longer accessible/available.

Figure 7:
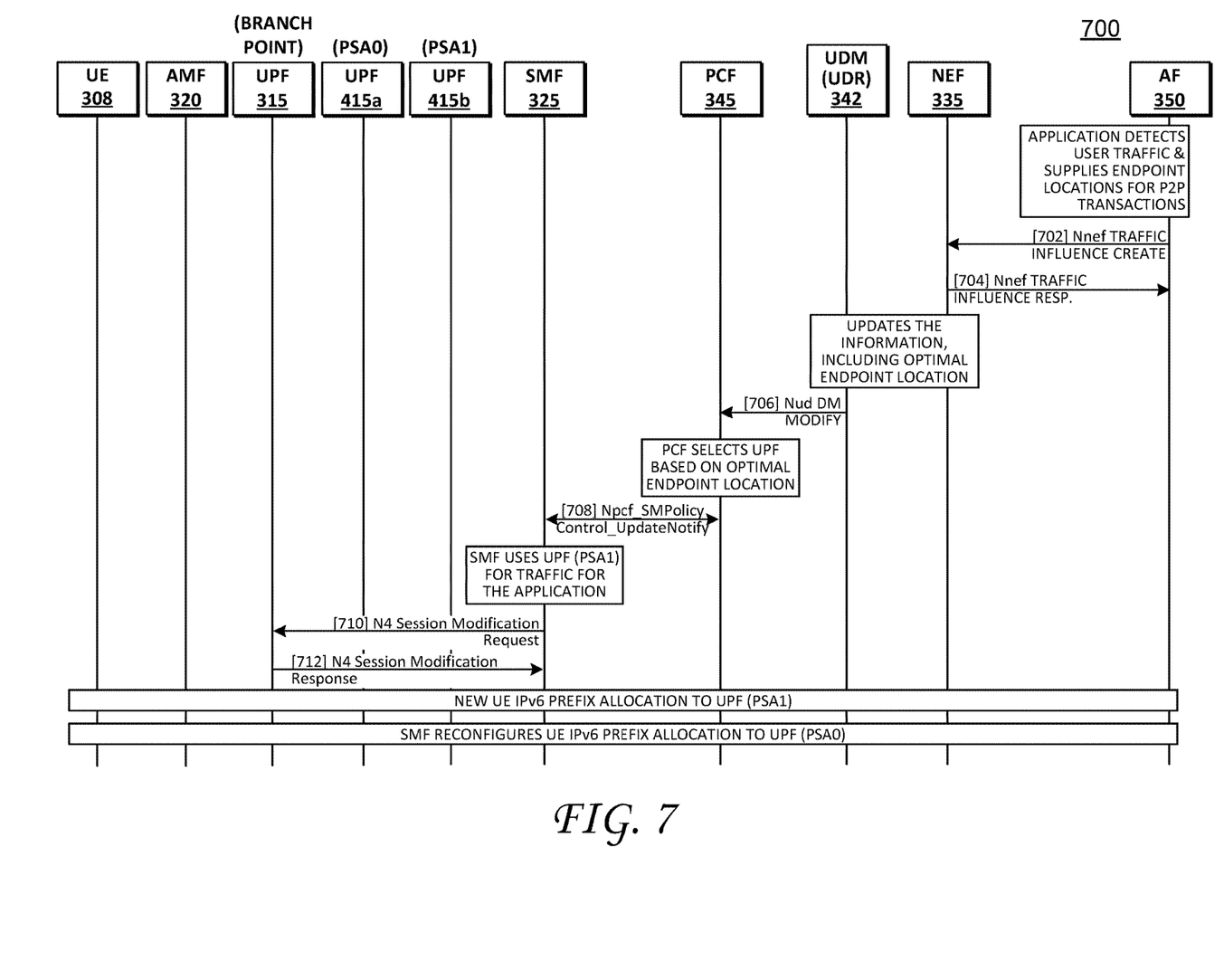
FIG. 7 illustrates a schematic signalling diagram of call flows between core network entities of the SBA shown in FIG. 2 in support of the edge node optimization processes of this disclosure.

FIG. 7 illustrates a schematic signaling diagram 700 of call flows between various core network entities of SBA 132 (e.g., ref. FIG. 2) in support of the edge node optimization processes. It is appreciated that while the above-discussed edge node optimization operations are described with respect to a single entity, in some examples, the edge node optimization process may be performed by a distributed group of network entities, as illustrated by FIG. 7.

Signaling diagram 700 begins with an application function, AF 350, that detects user traffic and exchanges endpoint locations for peer-to-peer transactions (for a user/UE 405) to NEF 335 shown by step 702 and step 704. Notably, in this example, AF 350 and/or an application provider associated with AF 350 performs the above-discussed edge node optimization process to determine one or more optimal edge node locations for the various peer endpoints associated with the peer-to-peer transactions. However, in some embodiments, it is appreciated that AF 350 may provide the underlying geo-social network data to one or more of the network functions in SBA 132 to calculate the optimal edge node location(s).

NEF 335 receives the endpoint locations from AF 350, which includes the optimal edge node location(s), and updates subscriber information at UDM/UDR 342. At step 706, UDM/UDR 342 sends a message to PCF 345 to select or modify the UPF (e.g., UPF 315) based on the optimal edge node location(s). In turn, at step 708, PCF 345 communicates with SMF 325 to perform session management functions for the peer-to-peer application. Here, these session management operations include selecting a new UPF—e.g., UPF 415b for subsequent peer-to-peer transactions for the application. These session management operations include step 710 and 712, which illustrate SMF 325 signaling with UPF 315 to perform a session modification request.

Subsequently, signaling corresponds to allocating IPv6 prefixes to respective UPFs and changing PDU Session Anchors (PSA) between UPF 315, UPF 415a (PSA0) and UPF 415b (PSA1). SMF 325 may insert an intermediate UPF or relocate the PDU Session Anchor (PSA) based on AF traffic influence (e.g., in accordance with 3GPP TS 23.501, clause 5.6.7). The application provides feedback to SMF 325 through the PCF 345 (or the NEF) to specify a local UPF and associated IPv6 prefix specific to the data network (DN) of the application server at the edge location. Additional details of this signaling can be found in 3GPP TS 23.501, as is appreciated by those skilled in the art.

Figure 8:
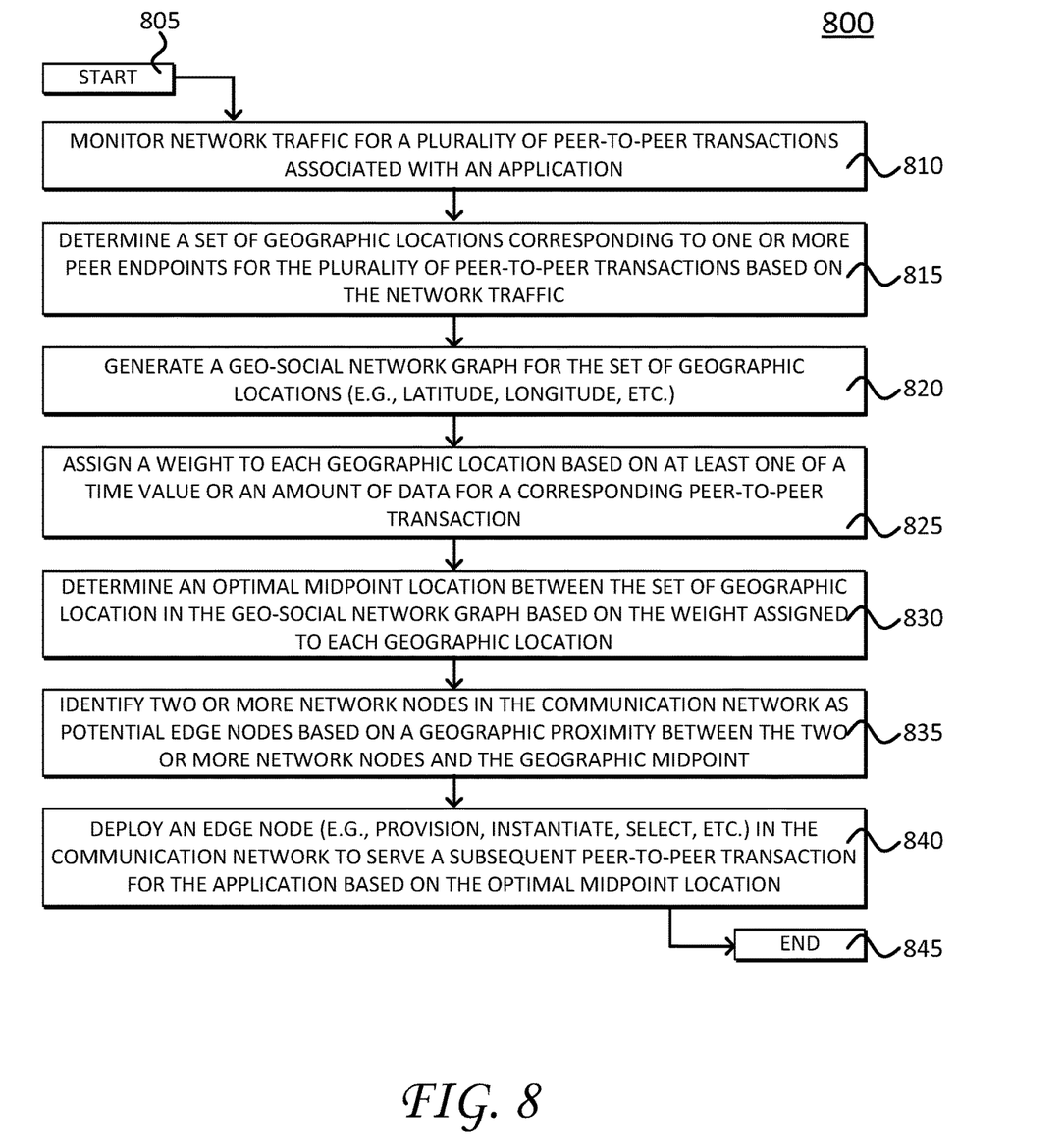
FIG. 8 illustrates an example simplified procedure for selecting and deploying an optimal edge node for peer-to-peer communications in a communication network based on geo-social network data, in accordance with one or more examples of this disclosure.

FIG. 8 illustrates an example simplified procedure 800 for selecting and deploying an optimal edge node for peer-to-peer transactions over a communication network based on geo-social network data, in accordance with one or more examples of this disclosure. For example, the steps shown in procedure 800 may be performed by one or more network entities, as discussed above. As mentioned, these network entities can include network device 200, network functions (NFs) that form SBA 132, or even application functions (AFs) from an application provider.

Procedure 800 begins at step 805 and continues on to step 810 where, as discussed above, the network entity monitors network traffic for a plurality of peer-to-peer transactions associated with an application. Notably, each peer-to-peer transaction includes communications between a user and a peer. For example, the communications can include the above-discussed geo-social network data.

The network entity further determines, at step 815, a set of geographic locations corresponding to one or more peer endpoints for the plurality of peer-to-peer transactions based on the network traffic (e.g., the geo-social network data). The network entity further generates, at step 820, a dynamic geo-social network graph for the set of geographic locations (e.g., coordinates such as latitude, longitude, etc.) corresponding to the peer endpoint nodes for the peer-to-peer transactions.

At step 825, the network entity assigns a weight to each of the peer endpoint geographic locations based on at least one of a time value or an amount of data for a corresponding peer-to-peer transaction. Here, the time value corresponds to the time decay factors discussed above and the amount of data corresponds to a byte count for the peer-to-peer transaction. Notably, additional weighting may be used as mentioned above (e.g., based on content type, QoE, QoS, bandwidth, latency, and so on).

The network entity further determines, at step 830 an optimal midpoint location between the set of geographic locations corresponding to the peer endpoints based on the respective weights and time factors.

At step 835, the network entity identifies two or more network nodes in the communication network as potential edge nodes based on a geographic proximity between the two or more network nodes and the geographic midpoint. At step 840, the network entity deploys an edge node to serve a subsequent peer-to-peer transaction for the application based on the optimal midpoint. For example, the network entity can select one the network nodes identified in step 835, instantiate a new edge node, pre-provision a UPF at an edge node proximate to the optimal midpoint location, and the like.

Procedure 800 subsequently ends at step 845, but may return again to step 810 the network entity monitors the network traffic for peer-to-peer transactions associated with an application.

It should be noted that certain steps within procedure 800 may be optional, and further, the steps shown in FIG. 8 are merely example steps for illustration—additional steps may be included or excluded as desired. Further, while a particular order of the steps is shown, this ordering is merely illustrative, and any suitable arrangement of the steps may be utilized without departing from the scope of the embodiments herein.

In addition, while procedure 800 generally describes operations for deploying an edge node for a single user and a single application, it is appreciated that such operations can be readily modified for multiple users of the application.

The techniques described herein, therefore, describe processes to determine optimal edge node locations and deploy corresponding edge nodes based on the same. For example, the processes generally include operations to calculate a geographical midpoint location of a user's peer transactions in the context of their application activity, aggregate the user geo-midpoint data to optimally calculate edge node placement, selecting (e.g., by a service provider) optimal edge nodes based on the same. Notably, the placement of the peer edge nodes can be used by service providers to plan optimal placement of data centers. In some examples, the optimal location for the peer edge node can be determined on a more granular basis based on time slices that prioritize different user behavior during different time periods and/or based on time decay functions that prioritize more current or recent user behavior. As discussed above, these processes may be performed by various devices, systems, entities, and the like.

Modeling peer-to-peer transactions and developing centers for user activity (both individually and in aggregate) using a large number of applications can lead to highly useful data for edge node deployment and selection. The above-discussed processes use this data to intelligently place UPF network functions and other edge functions to deliver services. This may also be used to understand workload placement for events in regularity. As peer-to-peer network traffic proliferates in mobile networks, application requirements for low latency and therefore node placement and selection become critical for an enhanced end-user experience. Accordingly, the processes disclosed herein use geo-social analysis of peer endpoints and subsequent feedback to the service provider (e.g., from an application provider) to deploy and optimally select network entities on a per end-user application basis.

While there have been shown and described illustrative embodiments of the peer-to-peer (P2P) edge node optimization process and corresponding operations in a specific network context (e.g., a mobile core network for a 5G network), it is to be understood that various other adaptations and modifications may be made within the spirit and scope of the embodiments herein. For example, the embodiments and operations disclosed herein have been described with respect to certain entities, devices, NFs, interfaces, and systems, however it is appreciated that such embodiments are provided for purposes of example, not limitation and that the techniques disclosed herein can be readily incorporated as part of existing wireless networks (e.g., 4G networks).

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for deploying an edge node to support peer-to-peer transactions, the method comprising:
monitoring, by a network entity, network traffic for a plurality of peer-to-peer transactions associated with an application, each peer-to-peer transaction including communications between a user and a peer in a communication network;
determining, by the network entity, a set of geographic locations corresponding to at least two peer endpoints for the plurality of peer-to-peer transactions based on the network traffic;
determining, by the network entity, a time value for each peer-to-peer transaction based on the network traffic, the time value emphasizing recent peer-to-peer transactions;
assigning a weight to each geographic location of the set of geographic locations based on at least the time value for a corresponding peer-to-peer transaction;
determining, by the network entity, an optimal midpoint location between the set of geographic locations based on the weight assigned to each geographic location; and
deploying, by the network entity, an edge node in the communication network to serve a subsequent peer-to-peer transaction for the application based on the optimal midpoint.

2. The method of claim 1, further comprising:
identifying, by the network entity, two or more network nodes in the communication network as potential edge nodes based on a geographic proximity between the two or more network nodes and the optimal midpoint location between the set of geographic locations; and
wherein deploying the edge node in the communication network further comprises selecting one of the potential edge nodes to serve as the edge node for the subsequent peer-to-peer transaction.

3. The method of claim 1, wherein determining the set of geographic locations further comprises generating a geo-social network graph based on the network traffic, the geo-social network graph representing the set of geographic locations corresponding to at least two peer endpoints, the method further comprising:
determining an amount of data for each peer-to-peer transaction based on the network traffic;
the assigning is further based on the amount of data for a corresponding peer-to-peer transaction.

4. The method of claim 1, further comprising:
determining, by the network entity an amount of data for each peer-to-peer transaction based on the network traffic;
the assigning based is further based on the amount of data.

5. The method of claim 4, further comprising:
modifying the time value based on a time period.

6. The method of claim 1, wherein the network entity is a core network entity in the communication network, wherein the network traffic includes peer-to-peer transaction data, wherein monitoring the network traffic further comprises receiving, by the core network entity, peer-to-peer transaction data from an application function.

7. The method of claim 1, wherein deploying the edge node further comprises selecting one network node from a plurality of network nodes in the communication network to serve as the edge node.

8. The method of claim 1, wherein deploying the edge node further comprises instantiating a new network node in the communication network to serve as the edge node.

9. The method of claim 1, wherein deploying the edge node in the communication network further comprises deploying the edge node at a geographic location proximate to the optimal midpoint location.

10. The method of claim 1, wherein determining the optimal midpoint location further comprises determining at least one of a center of gravity for the set of geographic locations or an average distance between the set of geographic locations.

11. The method of claim 1, wherein the set of geographic locations include latitude and longitude coordinates corresponding to User Equipment (UE) associated with the at least two peer endpoints.

12. The method of claim 1, wherein the network entity includes at least one of an Application Function (AF) or a Network Function (NF).

13. A network device, comprising:
one or more network interfaces to communicate within a communication network;
a processor coupled to the one or more network interfaces and adapted to execute one or more processes; and
a memory configured to store instructions executable by the processor, wherein the instructions, when executed, are operable to:
monitor network traffic for a plurality of peer-to-peer transactions associated with an application, each peer-to-peer transaction including communications between a user and a peer in the communication network;
determine a set of geographic locations corresponding to at least two peer endpoints for the plurality of peer-to-peer transactions based on the network traffic;
determine a time value for each peer-to-peer transaction based on the network traffic, the time value emphasizing recent peer-to-peer transactions;
assign a weight to each geographic location of the set of geographic locations based on at least the time value for a corresponding peer-to-peer transaction;
determine an optimal midpoint location between the set of geographic locations based on the weight assigned to each geographic location; and
deploy an edge node in the communication network to serve a subsequent peer-to-peer transaction for the application based on the optimal midpoint.

14. The network device of claim 13, wherein the instructions, when executed, are further operable to:
identify two or more network nodes in the communication network as potential edge nodes based on a geographic proximity between the two or more network nodes and the optimal midpoint location; and
wherein the instructions to deploy the edge node in the communication network are further operable to select one of the potential edge nodes to serve as the edge node for the subsequent peer-to-peer transaction.

15. The network device of claim 13, wherein the instructions to determine the set of geographic locations are further operable to generate a geo-social network graph based on the network traffic, the geo-social network graph representing the set of geographic locations corresponding to at least two peer endpoints, wherein the instructions, when executed, are further operable to:
   determine an amount of data for each peer-to-peer transaction based on the network traffic;
   the assign is further based on the amount of data for a corresponding peer-to-peer transaction.

16. The network device of claim 13, wherein the instructions, when executed, are further operable to:
   determine an amount of data for each peer-to-peer transaction based on the network traffic;
   the assign is further based on the amount of data.

17. A tangible, non-transitory, computer-readable media having instructions encoded thereon, the instructions, when executed by a processor, are operable to:
   monitor network traffic for a plurality of peer-to-peer transactions associated with an application, each peer-to-peer transaction including communications between a user and a peer in a communication network;
   determine set of geographic locations corresponding to at least two peer endpoints for the plurality of peer-to-peer transactions based on the network traffic;
   determine a time value for each peer-to-peer transaction based on the network traffic, the time value emphasizing recent peer-to-peer transactions;
   assign a weight to each geographic location of the set of geographic locations based on at least the time value for a corresponding peer-to-peer transaction;
   determine an optimal midpoint location between the set of geographic locations based on the weight assigned to each geographic location; and
   deploy an edge node in the communication network to serve a subsequent peer-to-peer transaction for the application based on the optimal midpoint.

18. The tangible, non-transitory, computer-readable media of claim 17, wherein the instructions, to determine the set of geographic locations are further operable to generate a geo-social network graph based on the network traffic, the geo-social network graph representing the set of geographic locations corresponding to at least two peer endpoints, wherein the instructions, when executed, are further operable to:
   determine an amount of data for each peer-to-peer transaction based on the network traffic; and
   the assign is further based on the amount of data for a corresponding peer-to-peer transaction.

19. The tangible, non-transitory, computer-readable media of claim 17, wherein the instructions, when executed, are further operable to:
   determine an amount of data for each peer-to-peer transaction based on the network traffic;
   the assign is further based on the amount of data.

\* \* \* \* \*